United States Patent
Reed et al.

(10) Patent No.: US 12,031,273 B2
(45) Date of Patent: Jul. 9, 2024

(54) SYSTEM AND METHOD OF DYNAMIC CORRECTIVE ENZYME SELECTION AND FORMULATION FOR PULP AND PAPER PRODUCTION

(71) Applicant: Buckman Laboratories International, Inc., Memphis, TN (US)

(72) Inventors: Mark Reed, Bartlett, TN (US); Feiran Li, Memphis, TN (US); John Carter, Memphis, TN (US)

(73) Assignee: Buckman Laboratories International, Inc., Memphis, TN (US)

( * ) Notice: Subject to any disclaimer, the term of this patent is extended or adjusted under 35 U.S.C. 154(b) by 42 days.

(21) Appl. No.: 17/543,845

(22) Filed: Dec. 7, 2021

(65) Prior Publication Data
US 2022/0186441 A1    Jun. 16, 2022

Related U.S. Application Data

(60) Provisional application No. 63/125,250, filed on Dec. 14, 2020.

(51) Int. Cl.
| | |
|---|---|
| D21H 23/04 | (2006.01) |
| B82Y 30/00 | (2011.01) |
| B82Y 40/00 | (2011.01) |
| D21C 5/00 | (2006.01) |
| D21H 13/26 | (2006.01) |
| D21H 17/00 | (2006.01) |
| D21H 17/68 | (2006.01) |
| D21H 23/76 | (2006.01) |
| D21H 27/00 | (2006.01) |
| H01B 3/52 | (2006.01) |

(52) U.S. Cl.
CPC ........... D21H 17/005 (2013.01); D21C 5/005 (2013.01); D21H 23/76 (2013.01)

(58) Field of Classification Search
CPC ....... D21H 17/005; D21H 23/76; D21C 5/005
See application file for complete search history.

(56) References Cited

U.S. PATENT DOCUMENTS

| | | | |
|---|---|---|---|
| 5,508,173 A | 4/1996 | Amano et al. | |
| 6,379,495 B1 | 4/2002 | Giovannozzi Sermanni et al. | |
| 6,426,200 B1* | 7/2002 | Yang | D21C 5/025 435/72 |
| 7,433,727 B2 | 10/2008 | Ward et al. | |
| 8,685,743 B2 | 4/2014 | Zhang et al. | |
| 8,784,613 B2 | 7/2014 | Bryant et al. | |
| 8,883,436 B2 | 11/2014 | Malten et al. | |
| 9,103,830 B2 | 8/2015 | Yang et al. | |
| 9,234,867 B2 | 1/2016 | Briman et al. | |
| 10,327,686 B2 | 6/2019 | Nogueira et al. | |
| 10,788,477 B2 | 9/2020 | Beauregard et al. | |
| 11,066,692 B2 | 7/2021 | Cali et al. | |
| 11,266,332 B2 | 3/2022 | Huang et al. | |
| 11,445,951 B2 | 9/2022 | Ajemba et al. | |
| 2013/0065257 A1 | 3/2013 | Wang et al. | |
| 2014/0106408 A1* | 4/2014 | Mitchinson | C12Y 302/01021 435/162 |
| 2017/0328006 A1 | 11/2017 | Tausche et al. | |
| 2020/0245910 A1 | 8/2020 | Grosman et al. | |
| 2022/0178867 A1 | 6/2022 | Wang et al. | |
| 2022/0284391 A1 | 9/2022 | Fischer et al. | |

FOREIGN PATENT DOCUMENTS

| | | |
|---|---|---|
| CN | 105986006 A | 10/2016 |
| CN | 109187708 A | 1/2019 |
| CN | 111326743 A | 6/2020 |
| CN | 112326757 B | 12/2022 |
| JP | 2004236633 A | 8/2004 |
| JP | 4505651 B2 | 7/2010 |
| KR | 100342378 B1 | 7/2002 |
| KR | 1020090039516 A | 4/2009 |
| WO | 03014029 A2 | 2/2003 |
| WO | 2006063587 A1 | 6/2006 |
| WO | 2020067647 A1 | 4/2020 |

OTHER PUBLICATIONS

Search Report & Written Opinion for International Application No. PCT/US2021/062109, dated Apr. 11, 2022, 9 pages.

* cited by examiner

*Primary Examiner* — Jacob T Minskey
*Assistant Examiner* — Stephen M Russell
(74) *Attorney, Agent, or Firm* — Patterson Intellectual Property Law, PC

(57) ABSTRACT

Systems and methods as disclosed herein automatically provide real-time dosing corrections for an industrial process wherein enzyme blends are applied to natural fibers for pulp/paper production. An initial enzyme blend (e.g., enzymes and supporting formulation components, as relevant) and respective dose rates are selected to be applied based on expected fiber surface substrate characterization, expected fiber quality characterization, the physical conditions of the system being treated, respective characteristics of the initially selected enzyme blend components, etc. Upon application of the initial enzyme blend, online sensors provide real-time feedback data corresponding to measured actual values for the fiber surface substrate characterization and fiber quality characterization. A replacement enzyme blend (enzymes and supporting formulation components) and respective dose rates thereof is dynamically selected based on the feedback data. The enzyme dosing stage can be optimized responsive to product changes and/or variations in fiber sources/blend and/or physical conditions, substantially in real time.

10 Claims, 2 Drawing Sheets

SYSTEM AND METHOD OF DYNAMIC CORRECTIVE ENZYME SELECTION AND FORMULATION FOR PULP AND PAPER PRODUCTION

CROSS-REFERENCES TO RELATED APPLICATIONS

This application claims benefit of U.S. Provisional Patent Application No. 63/125,250, filed Dec. 14, 2020, and which is hereby incorporated by reference.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

FIELD OF THE INVENTION

The present invention relates generally to systems and methods for component characterization and feedback implementation in industrial processes.

More particularly, embodiments of inventions as disclosed herein relate to systems and methods for optimizing enzyme selection and dosing in pulp and paper production, and further proactively correcting enzyme dosing in real time based on feedback from online sensors and data analytics. However, alternative embodiments of the systems and methods as disclosed herein may be directed to other processes such as for example biomass production.

BACKGROUND

Conventional paper making processes may generally include: the formation an aqueous suspension of cellulosic fibers, commonly known as pulp; adding various processing and paper enhancing materials, such as strengthening, retention, drainage aid, and/or sizing materials, or other functional additives; sheeting and drying the fibers to form a desired cellulosic web; and post-treating the web to provide various desired characteristics to the resulting paper, such as surface application of sizing materials, and the like. Various types of enzymatic compositions, of various enzyme dose ratios, may accordingly be applied to treat the fibers to improve properties of the pulp (e.g., improve the drainage of the fiber suspension slurry) and/or the properties of the finished sheet (e.g. strength, porosity, softness).

As pulp and paper producers purchase and/or produce fiber and undertake grade development activities, the fiber properties of the fiber are observed to change as a result of multiple reasons including, but not limited to, the species of tree used in generating the fibers, the blend of fiber used, whether a fiber is virgin or recycled, tree growth conditions, seasonality, pulping process, pulp treatment, and the like. This introduces inherent variability into their process and can alter the type and amount of enzyme that should be dosed to a system for the application of bleaching and/or fiber modification enzymes. Adding the wrong mix or dose of enzymes may result in unnecessary activities, waste in chemical spend, or over-development of the fiber, further resulting in lost efficiency.

It would be desirable to generate and utilize a database of fiber surface characterization data, fiber quality analysis, system physical conditions (e.g. temp, pH, flow rate, conductivity, ORP, biocide residual) and appropriate enzyme pumping equipment to ensure that the dosing of an enzyme is optimized for a particular fiber/furnish and system.

It would further be desirable if such an optimized dosing technique could be applied to the bleaching process and/or on paper machines to assist with bleaching and/or physical properties of the finished sheet (e.g., tensile strength, burst, drainage, porosity, etc.).

Conventional systems and methods are known to implement limited examples of fiber surface characterization, fiber quality analysis, and manual and online sensors for physical conditions and enzyme formulation for improved stability and performance.

However, such conventional techniques are substantially limited in that they utilize technology that is all too frequently unreliable in practice, and typically focus on a single piece of the enzyme selection and formulation process, rather than providing or otherwise enabling the implementation of a more holistic framework.

BRIEF SUMMARY

Generally stated, systems and methods as disclosed herein represent technical advancements over the prior art, at least in that they may utilize a database of information to provide algorithms for product selection and application that can be adjusted, substantially in real-time, using measurements of fiber and physical conditions. Such algorithms may be dynamic in nature based on observed correlations over time between various combinations of process inputs and desired outcomes in the form of fiber quality, product efficacy, and the like.

Systems as disclosed herein may preferably implement accessible visualization graphics, alarms, notifications, and the like via onboard user interfaces, mobile computing devices, web-based interfaces, etc., to supplement any automated capabilities with actionable insights relating to the associated processes.

Exemplary techniques for predictive model development may include supervised and unsupervised learning, hard and soft clustering, classification, forecasting, and the like.

One objective of the present disclosure is to provide a database of several key fiber, enzyme, and system data points to identify an optimum enzyme blend and dose for a particular application. In short, a system and method may relate fiber surface substrate characterization, fiber quality analysis data (including elements like fiber length, fiber width, fibrillation, kink, curl, etc.), enzyme activity fingerprints, physical measurements from the process (pH, temperature, and flow rate/retention time), and product efficacy data to provide an initial product blend and dose rate. The system can be implemented for an individual aspect of the overall process or may be implemented as part of a pumping skid that can blend multiple raw materials together to attain the optimum blend and dose rate. This skid may for example be integrated with online sensors of flow rate, temperature, chemical residual and pH, as well as system data relating to the strength, freeness and quality of the finished sheet, to determine if optimum dosing has been achieved. Furthermore, as data related to fiber quality and substrate prevalence is collected and uploaded to the system, the balance of the enzymatic raw materials present may be adjusted over time.

System outputs may for example feed into a dosing skid that would blend enzymatic raw materials for delivery straight into a pulp or papermaking application and may be particularly advantageous with respect to at least pulp bleaching and tissue/packaging/paper making applications.

The systems and methods as disclosed herein may further utilize a front-end data capture application that feeds information into the overall database, wherein such information may further be communicated to the blending and dosing skid either wirelessly or via integrated signals. Various sensors, controllers, online devices, and other intermediate components may be "Internet-of-things" (IoT) compatible, or otherwise comprise an interrelated network, wherein relevant outputs may be uploaded to a cloud-based server in real time.

In view of some or all of the aforementioned issues and objectives, a first exemplary embodiment of a method as disclosed herein automatically provides real-time dosing corrections in an industrial process wherein one or more enzymes (and supporting formulation components) are applied to natural fibers for producing a pulp or paper product. Such natural fibers may of course include wood fibers, but also potentially other cellulosic fibers and non-traditional paper furnishes including bamboo, grasses (e.g. bagasse) etc. A first step includes selecting an initial enzyme blend to be applied, and respective dose rates for one or more components thereof, based at least in part on input data comprising an expected fiber surface substrate characterization for the pulp or paper product, an expected fiber quality characterization for the pulp or paper product, and one or more respective characteristics of the one or more enzyme blend components. Upon application of the initial enzyme blend and respective dose rates for the one or more components thereof, real-time feedback data is provided corresponding to measured actual values for the fiber surface substrate characterization and fiber quality characterization. Another step includes dynamically selecting a replacement enzyme blend to be applied, and respective dose rates for one or more components thereof, based at least in part on the feedback data.

In a second embodiment, one exemplary aspect according to the above-referenced first embodiment may include that the initial enzyme blend to be applied and the respective dose rates are selected further based on expected values for one or more industrial process characteristics, and the real-time feedback data further comprises measured values for the one or more industrial process characteristics.

In a third embodiment, one exemplary aspect according to any one of the above-referenced first and second embodiments may further include that the real-time feedback data further comprises measured values for industrial process characteristics comprising one or more of a temperature, a system flow rate, a pH value, a conductivity value, an ORP value, a biocide residual value, and a residence time. Still further examples of characteristics considered may include pulp furnish and pulping method.

In a fourth embodiment, one exemplary aspect according to any one of the above-referenced first to third embodiments may include that the initial enzyme bland and respective dose rates are selected using a predetermined model associated with a pulp or paper product to result from the industrial process, and the method further comprises selectively altering the predetermined model based at least in part on the provided real-time feedback data.

In a fifth embodiment, one exemplary aspect according to any one of the above-referenced first to fourth embodiments may include blending the one or more components of the initial enzyme blend in accordance with a first overall dose rate, and applying said blended one or more components of the initial enzyme blend in the industrial process. Said exemplary aspect may be provided via a dosing control stage (e.g., embodied by or otherwise including a dosing controller), which may further be configured for example for blending the one or more components of the selected replacement enzyme blend in accordance with an overall dose rate, and applying said blended one or more components of the selected replacement enzyme blend in place of one or more components of the initial enzyme blend.

In a sixth embodiment, one exemplary aspect according to any one of the above-referenced first to fifth embodiments may include that the fiber quality characterization is determined with respect to one or more of a fiber length, width, fibrillation, cell wall thickness, fines density/distribution, fiber kink, and fiber curl.

In a seventh embodiment, one exemplary aspect according to any one of the above-referenced first to sixth embodiments may include that the real-time feedback data further comprises system performance data regarding one or more of a fiber strength, a porosity, a caliper, a softness, a crepe count, a freeness and a drainage of the pulp or paper product.

In an eighth embodiment, one exemplary aspect according to any one of the above-referenced first to seventh embodiments may include that the selected initial enzyme blend and the dynamically selected replacement enzyme blend to be applied, and respective dose rates thereof, are provided to a pulp bleaching process controller.

In a ninth embodiment, one exemplary aspect according to any one of the above-referenced first to seventh embodiments may include that the selected initial enzyme blend and the dynamically selected replacement enzyme blend to be applied, and respective dose rates thereof, are provided to a paper manufacturing controller.

In a tenth exemplary embodiment, a system as disclosed herein automatically provides real-time dosing corrections in an industrial process wherein one or more components of an enzyme blend are applied to natural fibers for producing a pulp or paper product. A data storage unit comprises models correlating one or more pulp or paper products with respective expected fiber surface substrate characterization and expected fiber quality characterization, and further comprising data corresponding to enzyme characteristics. One or more online sensors are configured to generate output signals representative of measured actual values for the fiber surface substrate characterization and fiber quality characterization. A production stage may include a plurality of containers each configured to store and selectively deliver respective raw materials corresponding to selected enzyme blend components. A dosing control stage may including one or more computing devices functionally linked to the data storage unit and to the one or more online sensors and configured to direct the performance of steps in a method corresponding to any one of the first to ninth embodiments.

The one or more computing devices may for example include a dosing controller according to the above-referenced fifth exemplary embodiment.

In one further optional aspect, the production stage according to the tenth exemplary embodiment may comprise a pulp bleaching process controller configured to receive and apply the selected initial set of one or more enzymes and the dynamically selected replacement set of one or more enzymes, and respective dose rates thereof.

In one further optional aspect, the production stage according to the tenth exemplary embodiment may comprise a paper manufacturing controller configured to receive and apply the selected initial set of one or more enzymes and the dynamically selected replacement set of one or more enzymes, and respective dose rates thereof.

The computing device, the dosing controller, the pulp bleaching process controller, and/or paper manufacturing controller as described with respect to any one of the first to tenth exemplary embodiments may within the scope of the present disclosure be integrated in the same device, or some or all of them may be provided as discrete components.

Numerous objects, features and advantages of the embodiments set forth herein will be readily apparent to those skilled in the art upon reading of the following disclosure when taken in conjunction with the accompanying drawings.

DETAILED DESCRIPTION

Briefly stated, systems and methods as disclosed herein may be implemented to correlate furnish, system, and enzyme properties to provide a tailored or otherwise optimized dosing regimen for an enzyme blend as needed to maintain the ideal properties of a finished pulp or paper product. While the following description of embodiments of a system and method as disclosed herein may focus for illustrative purposes on the selection and formulation of one or more enzymes, one of skill in the art may appreciate the relevance of such methods in the corresponding selection and/or formulation of supporting components for enzymatic technologies such as non-ionic surfactants, polymers, etc., as potentially contributing to optimization of the system with respect to enzymatic activity. An enzyme and corresponding aids such as polymeric surfactants as used in systems and methods as disclosed herein may accordingly be supplied separately or collectively as an enzyme blend, the selection, formulation, and dynamic adaptation of which may be enhanced by various embodiments of the present disclosure.

Figure 1:
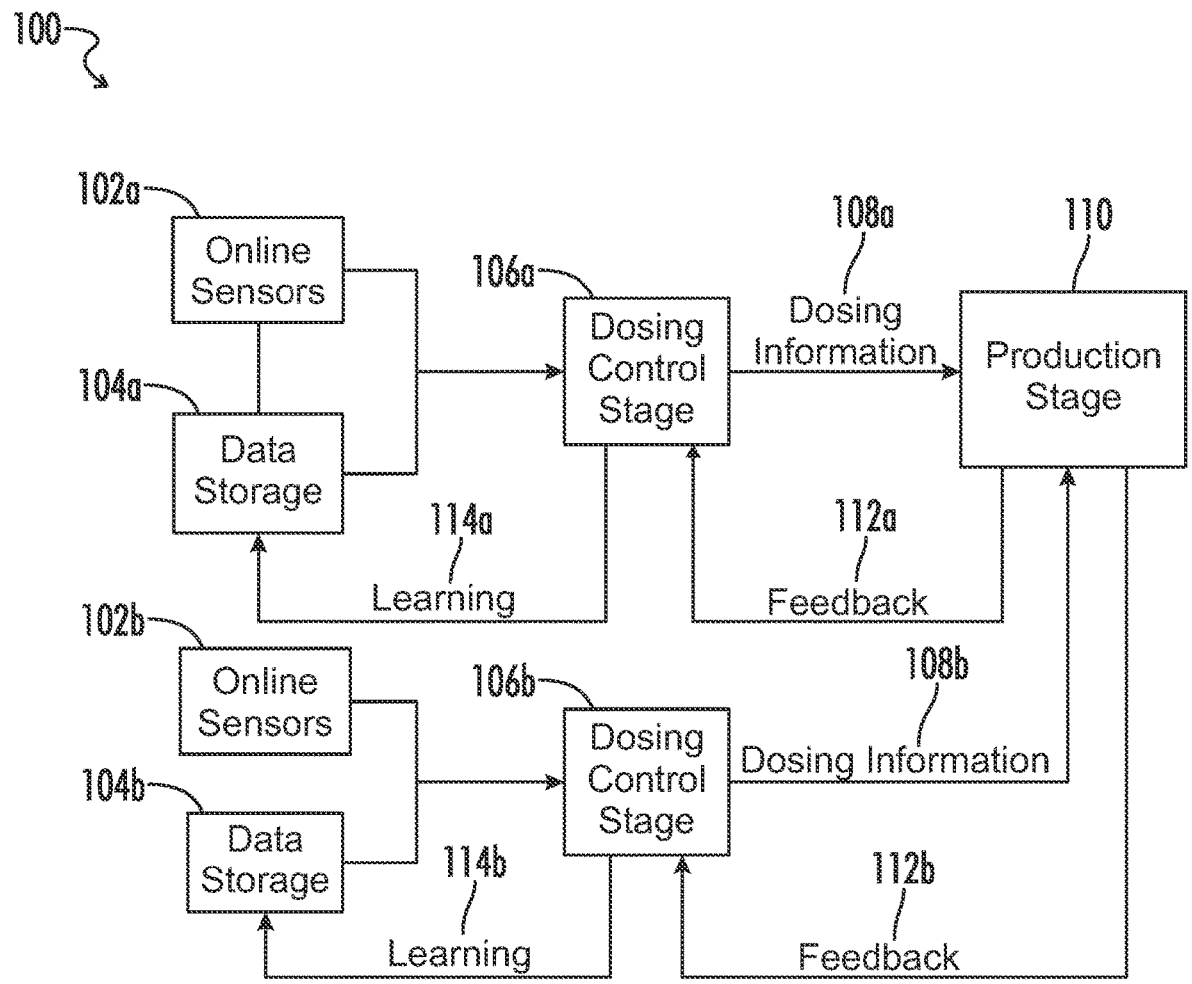
FIG. 1 is a block diagram representing an exemplary embodiment of a system as disclosed herein.

Referring initially to FIG. 1, a system 100 as disclosed herein may comprise multiple dosing control stages 106a, 106b, . . . 106x as illustrated in functional coordination with a production stage 110, e.g., a pulp or paper production stage, wherein each dosing control stage may be provided for respective enzymes to be applied in a prepared composition. Alternatively, selection and dosing operations may be performed with respect to a plurality of enzymes mixed together to form an enzyme product by a single dosing control stage within the scope of the present disclosure.

An array of sensors 102, for example including online sensors 102, are linked to the dosing control stage 106 along with data storage 104, for example including one or more databases 104 with models, algorithms, and data for implementing the methods and operations as disclosed herein. Outputs from the dosing control stage may include dosing information 108 provided to a pulp or paper production stage 110, which further provides feedback information 112 to the dosing control stage. The feedback 112 from the production stage 110 is illustrated independently with respect to the array of sensors 102, but it may be understood that the feedback 112 may include signals from the array of sensors. The dosing control stage 106 may further provide feedback information 114 to the data storage 104, for example in the context of model improvement via observation and machine learning.

The term "sensors" may include, without limitation, physical level sensors, relays, and equivalent monitoring devices as may be provided to directly measure values or variables for associated process components or elements, or to measure appropriate derivative values from which the process components or elements may be measured or calculated. The term "online" as used herein may generally refer to the use of a device, sensor, or corresponding elements proximally located to a container, machine or associated process elements, and generating output signals substantially in real time corresponding to the desired process elements, as distinguished from manual or automated sample collection and "offline" analysis in a laboratory or through visual observation by one or more operators.

Online sensors 102 are well known in the art for the purpose of sensing or calculating characteristics such as temperature, flow rate, ORP, conductivity, biocide residual, pH and the like, and exemplary such sensors are considered as being fully compatible with the scope of a system and method as disclosed herein. Individual sensors may be separately mounted and configured, or the system 100 may provide a modular housing which includes, e.g., a plurality of sensors or sensing elements. Sensors or sensor elements may be mounted permanently or portably in a particular location respective to the production stage 110 or may be dynamically adjustable in position so as to collect data from a plurality of locations during operation.

Online sensors 102 as disclosed herein may provide substantially continuous measurements with respect to various process components and elements, and substantially in real-time. The terms "continuous" and "real-time" as used herein, at least with respect to the disclosed sensor outputs, does not require an explicit degree of continuity, but rather may generally describe a series of measurements corresponding to physical and technological capabilities of the sensors, the physical and technological capabilities of the transmission media, the physical and technological capabilities of any intervening local controller, communications device, and/or interface configured to receive the sensor output signals, etc. For example, measurements may be taken and provided periodically and at a rate slower than the maximum possible rate based on the relevant hardware components, or based on a communications network configuration which smooths out input values over time, and still be considered "continuous."

A user interface (not shown) may further enable users such as operators, administrators, and the like to provide periodic input with respect to conditions or states of additional components of relevance to models, algorithms, or the like as further discussed herein. The user interface may be in functional communication with the dosing control stage 106, a distributed control system (not shown) associated with the industrial facility, and/or a remote hosted server (not shown) to receive and display process-related information, or to provide other forms of feedback with respect to, e.g., control processes as further discussed herein. The term "user interface" as used herein may unless otherwise stated include any input-output module with respect to the controller and/or the hosted data server including but not limited to: a stationary operator panel with keyed data entry, touch screen, buttons, dials or the like; web portals, such as individual web pages or those collectively defining a hosted website; mobile device applications, and the like.

The term "communications network" as used herein with respect to data communication between two or more system components or otherwise between communications network interfaces associated with two or more system components may refer to any one of, or a combination of any two or more of, telecommunications networks (whether wired, wireless, cellular or the like), a global network such as the Internet, local networks, network links, Internet Service Providers (ISP's), and intermediate communication interfaces. Any one or more conventionally recognized interface standards may be implemented therewith, including but not limited to Bluetooth, RF, Ethernet, and the like.

Figure 2:
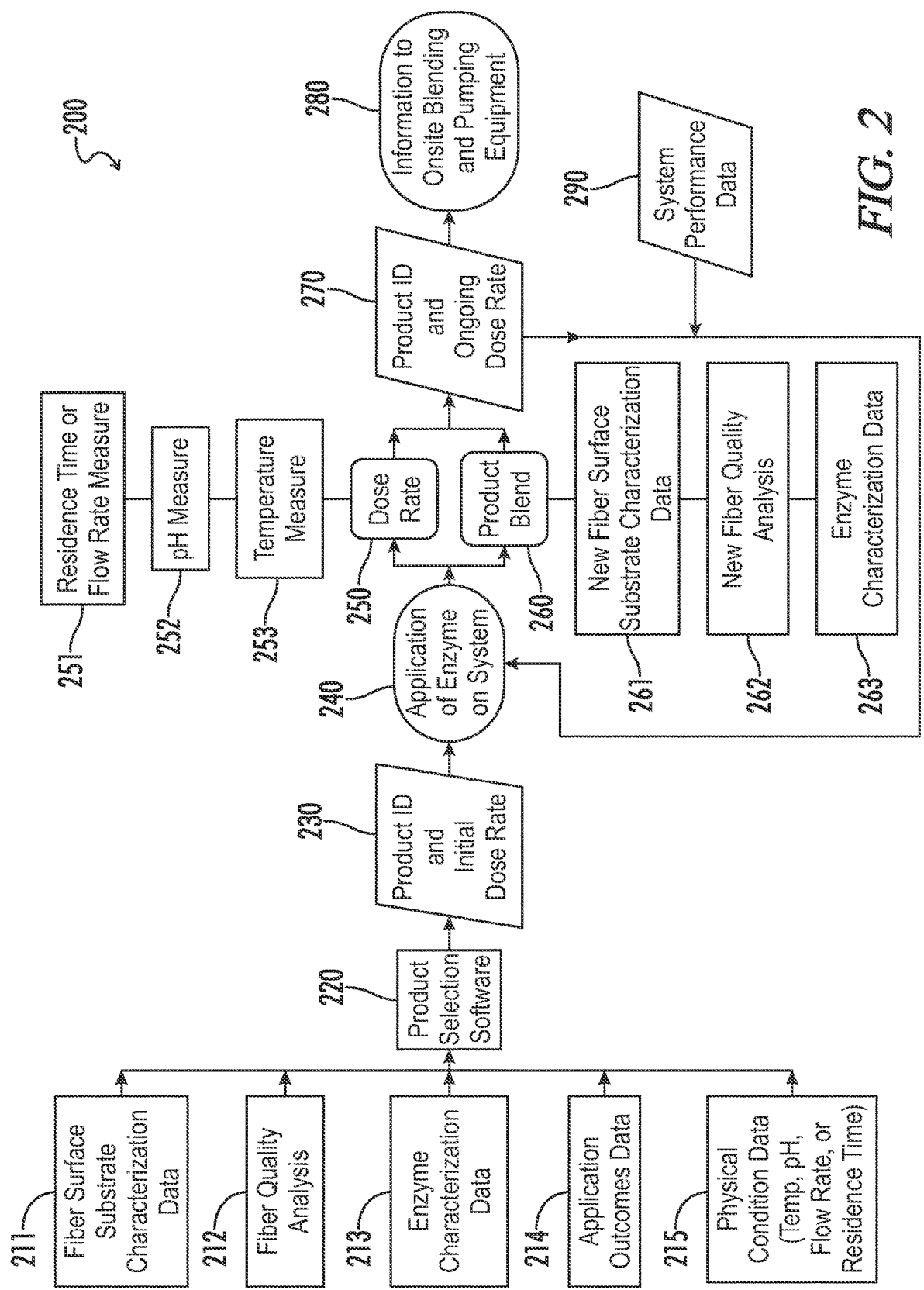
FIG. 2 is a diagram and simplified flowchart representing an exemplary embodiment of a method as disclosed herein for initial product and dose selection and subsequent adjustment based upon fiber and system parameters.

An embodiment of a method 200 may now be described with reference to FIG. 2, the illustrated steps in which are merely exemplary and not intended as expressly limiting the scope of the present disclosure unless otherwise specifically stated.

Various inputs 211-215 are provided for initial product selection 220, which may refer to selection of each enzyme to be applied, to one of a plurality of enzymes to be applied, or for example to an enzyme blend further incorporating one or more aids such as non-ionic surfactants or the like.

Fiber surface substrate characterization data 211 may in various embodiments be selectively extracted from a database communicatively linked to the dosing controller. Numerous conventional techniques are known for characterizing the fiber surface substrate in a manner that aids enzyme selection and formulation, and such techniques may be considered within the scope of the present disclosure and in combination with one or more other inputs as further described herein. Numerous techniques are conventionally known for fiber surface characterization, including for example X-ray photoelectron spectroscopy (XPS), scanning electron microscopy (SEM), time-of-flight secondary ion mass spectrometry (ToF-SIMS), Fourier transform infra-red (FTIR), etc. However, in the context of the present disclosure it may be preferred to utilize techniques for rapid characterization of fiber surface polymers that would better enable the prediction of the impact of various treatments on pulp or paper. An exemplary sensor (detection probe) and methods of use thereof as disclosed in U.S. Pat. No. 10,788,477 is incorporated herein by reference and may accordingly be implemented for such characterization within the scope of the present disclosure, or otherwise data obtained therefrom may be selectively accessible in a database for various enzyme selection and formulation steps or operations in accordance with the other inputs as described below.

Fiber quality data 212 may be collected and transmitted or uploaded to the dosing controller from one or more sensors as are known in the art, substantially in real time, and relating for example to conventional fiber quality variables such as fiber length, fiber width, fiber coarseness, fiber kink angle, fines quantity/density, fiber curl, external fibrillation, cell wall thickness, and the like. Such sensors may within the scope of the present disclosure be online measuring devices and/or automated or manually operable offline fiber image analyzers, and the like. Relevant outputs to the dosing control stage may further include raw sense signals, converted and/or derivative values thereof, machine learning classifications of sense signals, and the like.

Enzyme function characterization data 213 may for example relate to activity profiles or fingerprints as measured or otherwise retrieved from data storage in association with the given enzyme.

Application outcomes data 214 may generally relate to observed results from system performance feedback, for example in the context of machine learning with an objective to optimize future product blends and relative dosing, but may also encompass user inputs from a user interface to for example further define, confirm, or otherwise reverse system-generated findings.

Physical conditions data 215 may be collected and transmitted or uploaded to the dosing controller in substantially real time from one or more sensors as are known in the art, relating for example to conventional variables such as temperatures, pH values, flow rates, residence times, and the like. Such sensors to provide physical conditions data may within the scope of the present disclosure be online sensors and/or manual sensors.

A product identification and initial dose rate setting stage 230 may generally be configured to utilize the aforementioned inputs, e.g., relevant fiber, enzyme, and system data points, to identify an optimum enzyme blend and initial dose rate for a selected product application.

The next stage 240 and associated sub-steps collectively refer to application of selected enzyme(s) on the process, with a newly specified dose rate 250 and product blend 260. Feedback of measured physical conditions from the process, including for example a measured retention time or system flow rate 251, a measured pH 252, a measured temperature 253, or the like. Additional data influencing the product blend may further include new fiber surface substrate characterization data 261, new fiber quality analysis data 262, enzyme characterization data 263.

The newly specified product and an associated ongoing dose rate 270 may be provided, along with any other information as may be determined relevant by the dosing controller, to an onsite blending and pumping controller and associated equipment 280. In an embodiment as previously noted herein, the dosing control stage 106 (or respective dosing control stages 106a, 106b for different enzymes) may be integrated with the production stage 110, for example in the context of a dosing skid with appropriate enzyme pumping equipment. In other embodiments, the dosing control stage 106 (or respective dosing control stages 106a, 106b for different enzymes) may be discrete products or components of the overall system and configured to transmit the relevant information for downstream implementation (i.e., enzyme formulation and pumping) via a communications network, e.g., either wirelessly or via integrated signals.

Feedback data comprising system performance data 290 may pertain to bleaching and/or physical qualities of the finished product (e.g., sheet) including for example strength data, porosity, caliper, crepe count, softness, freeness, drainage, and the like, as preferably obtained in real time or a reasonable approximation thereof. Such feedback may be provided to the dosing controller to determine if optimum dosing has been achieved, and subsequently to repeat steps 240 to 280 as needed to dynamically adjust the selection and/or balance of the enzymatic raw materials present over time. The system performance data may be obtained from offline or online methods, and may be accessible directly from existing process data repositories, e.g. distributed control systems (DCS)

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may. As used herein, the phrase "one or more of," when used with a list of items, means that different combinations of one or more of the items may be used and only one of each item in the list may be needed. For example, "one or more of" item A, item B, and item C may include, for example, without limitation, item A or item A and item B. This example also may include item A, item B, and item C, or item B and item C.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable medium known in the art. An exemplary computer-readable medium can be coupled to the processor such that the processor can read information from, and write information to, the memory/storage medium. In the alternative, the medium can be integral to the processor. The processor and the medium can reside in an ASIC. The ASIC can reside in a user terminal. In the alternative, the processor and the medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A method of automatically providing real-time dosing corrections for an industrial process wherein one or more enzymatic compositions are applied to natural fibers for producing a pulp or paper product, the method comprising:
   for each of a plurality of pulp or paper products, developing predictive machine learning models by observing correlations over time between outcomes, associated with fiber surface substrate characterization and fiber quality characterization for the respective pulp or paper product, and various combinations of process inputs, comprising characteristics of a respective enzyme blend;
   for a particular pulp or paper product to be produced, using an associated model to select an initial enzyme blend to be applied, and respective dose rates for one or more components thereof, based at least in part on input data comprising an expected fiber surface substrate characterization for the pulp or paper product, and an expected fiber quality characterization for the pulp or paper product;
   upon application of the initial enzyme blend and respective dose rates for the one or more components thereof, providing real-time feedback data comprising measured values corresponding to an actual fiber surface substrate characterization and an actual fiber quality characterization; and
   dynamically selecting a replacement enzyme blend, and respective dose rates for one or more components thereof, based at least in part on the feedback data; and
   applying the selected replacement enzyme blend in place of at least a portion of the initial enzyme blend during the industrial process.

2. The method of claim 1, wherein the initial enzyme blend to be applied and the respective dose rates are selected further based on expected values for one or more industrial process characteristics, and the real-time feedback data further comprises measured values for the one or more industrial process characteristics.

3. The method of claim 2, wherein the real-time feedback data further comprises measured values for industrial process characteristics comprising one or more of a temperature, a system flow rate, a pH value, a conductivity value, an ORP value, a biocide residual value, and a residence time.

4. The method of claim 1, wherein the method further comprises selectively altering the predetermined model based at least in part on the provided real-time feedback data.

5. The method of claim 1, further comprising:
   blending the one or more components of the initial enzyme blend in accordance with a first overall dose rate, and
   applying said blended one or more components of the initial enzyme blend in the industrial process.

6. The method of claim 5, further comprising:
   blending the one or more components of the selected replacement enzyme blend in accordance with an overall dose rate, and
   applying said blended one or more components of the selected replacement enzyme blend in place of one or more components of the initial enzyme blend.

7. The method of claim 1, wherein the fiber quality characterization is determined with respect to one or more of a fiber length, width, fibrillation, cell wall thickness, fines density/distribution, fiber kink, and fiber curl.

8. The method of claim 1, wherein the real-time feedback data further comprises system performance data regarding one or more of a fiber strength, a porosity, a caliper, a softness, a crepe count, a freeness and a drainage of the pulp or paper product.

9. The method of claim 1, wherein the selected initial enzyme blend and the dynamically selected replacement enzyme blend to be applied, and respective dose rates thereof, are provided to a pulp bleaching process controller.

10. The method of claim 1, wherein the selected initial enzyme blend and the dynamically selected replacement enzyme blend to be applied, and respective dose rates thereof, are provided to a paper manufacturing controller.

\* \* \* \* \*